F. MARION & N. E. WILSON.
Hay-Raker and Loader.
No. 134,997. Patented Jan. 21, 1873.
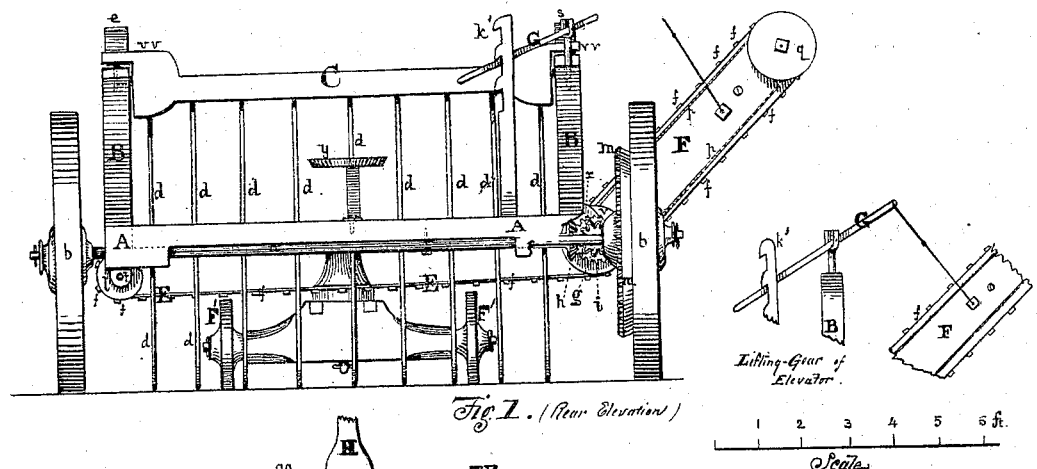
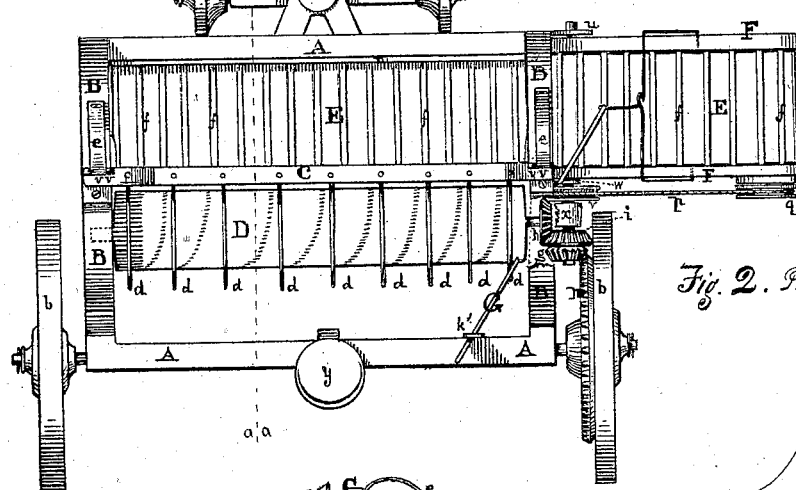
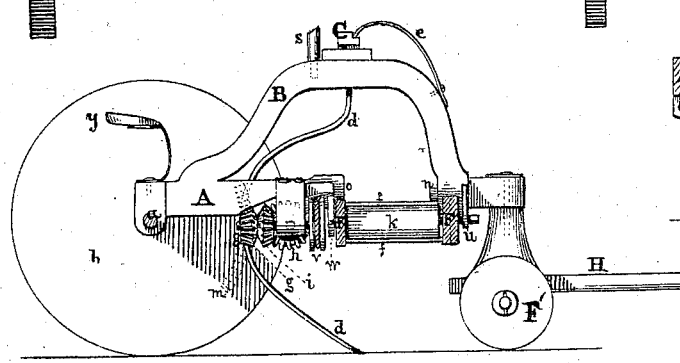

UNITED STATES PATENT OFFICE.

FRANK MARION AND NICHOLAS E. WILSON, OF GROVELAND, ILLINOIS.

IMPROVEMENT IN HAY RAKERS AND LOADERS.

Specification forming part of Letters Patent No. 134,997, dated January 21, 1873.

*To all whom it may concern:*

Be it known that we, FRANK MARION and NICHOLAS E. WILSON, of Groveland, in the county of Tazewell, and in the State of Illinois, have invented a Raking and Loading Machine for Hay; and do hereby declare that the following is a full, clear, and exact description thereof, reference being had to the annexed drawing making a part of this specification, in which like letters of reference refer to like parts, and in which—

Figure 1 represents a rear elevation; Fig. 2, a plan; Fig. 3, a side elevation; and Fig. 4, a vertical section through line $a\ a\ a\ a$, Fig. 2.

This invention relates to the rake-bar, provided with raised arms and pivoted at each end to suitably-constructed braces attached to the machine, in combination with springs, as will be hereinafter more fully explained; also, to the revolving beater in connection with draper and elevator, all arranged so as to operate together by means of intermediate gearing connected with a driving-gear of the wheel of the machine, as will be hereinafter more fully described.

A A A represent the frame, the rear bar carrying the axle of the wheels $b\ b$. B B, arched braces or supports at either end of frame and rising therefrom, in which is pivoted the horizontal cross or tooth bar C, which carries several curved iron teeth, $d\ d\ d$, &c., which are bent so as to pass to the rear of the "beater" D, and, curving thence downward and forward, reach the ground under the beater or draper. Springs $e\ e$, or equivalent devices, keep the teeth in contact with the soil by pressure against the raised arms $v\ v\ v\ v$, projecting from each end of the bar C, the springs being attached one to each brace B. D, the revolving beater, consisting of an oblong fan or centrally-pivoted board, on the same level as and parallel with the draper E, having bearings at each end in the sides of the frame A A, and extending in breadth from the teeth $d\ d\ d$, &c., to the side piece $z$ of the draper. This beater is revolved upward and forward by beveled wheel $h$ on one end of its axis, which gears with a similar wheel, $i$, on the axle of the adjoining draper-pulley $v$, which pulley and wheel $h$ (on the same spindle) are rotated by the wheel $m$ inside of the supporting-wheel $b$, which wheel $m$ engages with the wheel $g$ on the same spindle above mentioned. E E, the horizontal draper, of the usual form, which runs over rollers $k\ l$, pivoted at either side of the frame A A A, (in front of the beater D.) The draper runs over a third roller behind the roller-pulley $q$, to form the elevating part of the draper and machine, and the latter is carried forward by a belt, $p$, which passes around the pulleys $v\ q$, at the end of their respective rollers, the pulley $v$ being, as before said, operated by intermediate gearing with the cog-wheel $m$, on inside face of the supporting-wheel $b$. Across the draper are several slats, $f\ f\ f$, &c., or similar raking or holding devices, to carry the hay. The draper moves beneath parallel strips $n\ o$, attached to the inclosing-frame Z A, which also prevent the draper from springing upward from the roller $k$, at the angle where the web rises to the highest roller. F is the frame of the elevated part of the draper, and is pivoted on the axle of the roller $k$ and pulley $v$, at the side of frame A; F' F', wheels and axle supporting the tongue H and the front part of the machine; G, a lever, attached at the forward end to a rod connected with the elevator F, and pivoted, in the middle part, upon a standard, $s$, erected upon the frame A; and a notched upright rod, $k'$, forms a graduated scale in which to engage the handle of the lever to retain the elevator at the required height.

The operation of this invention is as follows: The teeth $d\ d\ d\ d$, &c., pass under the hay or grain stalks, which latter are, by the advance of the machine, continually pressed up the inclined surface of the teeth, assisted by the revolutions of the beater D in that direction, which finally throws the hay upon the draper E, which carries it up the elevator F into the dumping-wagon alongside of the machine.

The elevator is raised or lowered to suit the height of the wagon by means of the lever G, which is retained in one of the notches in the upright rod $k'$.

The teeth are made retractile on coming to uneven ground by the pivoting of the bar C, (which carries them,) and which lets the teeth rise, but is, immediately after the obstruction is passed, pressed back again by the operation of the springs $e\ e$ upon the arms $v\ v\ v\ v$ of the bar.

What we claim as our invention is—

1. The rake-bar C with its teeth $d$ having a pivotal connection at each end with braces B B and provided with raised arms $v\ v$, in combination with springs $e\ e$, substantially as and for the purpose set forth.

2. The revolving beater D, draper E, and elevator F, all arranged to operate together by means of the intermediate gearing connected with the driving-gear $m$ of wheel $b$, in combination with the rake C $d$, substantially as set forth.

In testimony that we claim the foregoing raker and loader, we have hereunto set our hands this 10th day of September, 1872.

FRANK MARION.
NICHOLAS E. WILSON.

Witnesses:
L. A. LAPHAM,
S. E. PARR.